United States Patent
Rydén et al.

(10) Patent No.: US 10,673,485 B2
(45) Date of Patent: Jun. 2, 2020

(54) METHOD AND RECEIVING NODE FOR DETERMINING TIME OF ARRIVAL, TOA, FOR A RECEIVED RADIO SIGNAL

(71) Applicant: Telefonaktiebolaget LM Ericsson (publ), Stockholm (SE)

(72) Inventors: Henrik Rydén, Solna (SE); Fredrik Gunnarsson, Linköping (SE); Sara Modarres Razavi, Linköping (SE); Ali Zaidi, Norrköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/083,036

(22) PCT Filed: Mar. 30, 2016

(86) PCT No.: PCT/SE2016/050263
§ 371 (c)(1),
(2) Date: Sep. 7, 2018

(87) PCT Pub. No.: WO2017/171593
PCT Pub. Date: Oct. 5, 2017

(65) Prior Publication Data
US 2019/0089405 A1 Mar. 21, 2019

(51) Int. Cl.
*H04B 1/7113* (2011.01)
*H04J 11/00* (2006.01)
(Continued)

(52) U.S. Cl.
CPC .............. *H04B 1/7113* (2013.01); *G01S 5/02* (2013.01); *G01S 5/0215* (2013.01);
(Continued)

(58) Field of Classification Search
CPC ... H04W 24/10; H04L 27/2614; H04J 11/063; H04B 17/336
See application file for complete search history.

(56) References Cited

U.S. PATENT DOCUMENTS 7,453,961 B1 * 11/2008 Li .................. G01C 21/206
342/357.61
2003/0054845 A1 3/2003 Krasny et al.
(Continued)

FOREIGN PATENT DOCUMENTS

GB 2422064 A 7/2006

OTHER PUBLICATIONS

Author Unknown, "Technical Specification Group Radio Access Network; Evolved Universal Terrestrial Radio Access Network (E-UTRAN); Stage 2 functional specification of User Equipment (UE) positioning in E-UTRAN (Release 13)," Technical Specification 36.305, Version 13.0.0, 3GPP Organizational Partners, Dec. 2015, 69 pages.
(Continued)

*Primary Examiner* — Gary Mui
(74) *Attorney, Agent, or Firm* — Sage Patent Group (57) ABSTRACT

A method and a receiving node for determining Time Of Arrival (TOA) for a radio signal received from a transmitting node in a wireless network. The receiving node detects the received radio signal by cross-correlating the received radio signal with a predefined reference signal transmitted by the transmitting node, to obtain a Cross-Correlated Function (CCF). The receiving node then estimates a set of candidate TOAs for respective signal components of the cross-correlated signal, and determines a final TOA for the received radio signal based on the set of candidate TOAs.

25 Claims, 8 Drawing Sheets (51) Int. Cl.
  *H04B 1/7107* (2011.01)
  *G01S 5/02* (2010.01)
  *H04B 1/71* (2011.01)
  *G01S 11/08* (2006.01)
  *H04B 17/336* (2015.01)
  *H04L 27/26* (2006.01)
  *H04W 24/10* (2009.01)
  *H04W 64/00* (2009.01)

(52) U.S. Cl.
  CPC ............ *G01S 5/0221* (2013.01); *G01S 11/08* (2013.01); *H04B 1/71* (2013.01); *H04B 1/71072* (2013.01); *H04B 17/336* (2015.01); *H04J 11/0063* (2013.01); *H04L 27/2614* (2013.01); *H04W 24/10* (2013.01); *H04W 64/00* (2013.01)

(56) References Cited

U.S. PATENT DOCUMENTS

| | | | | |
|---|---|---|---|---|
| 2003/0215035 | A1* | 11/2003 | Amerga | G01S 19/22 375/346 |
| 2003/0227895 | A1* | 12/2003 | Strutt | H04W 56/002 370/342 |
| 2005/0287956 | A1 | 12/2005 | Golden et al. | |
| 2007/0135054 | A1* | 6/2007 | Belcea | G01S 5/0221 455/67.11 |
| 2011/0286505 | A1* | 11/2011 | Hedley | G01S 5/0205 375/224 |
| 2012/0020320 | A1* | 1/2012 | Issakov | G01S 5/0221 370/330 |
| 2012/0320787 | A1* | 12/2012 | Sugar | G01S 5/021 370/252 |
| 2013/0250791 | A1* | 9/2013 | Sugar | H04W 24/00 370/252 |
| 2014/0266905 | A1* | 9/2014 | Sendonaris | G01S 1/02 342/385 |
| 2016/0179748 | A1* | 6/2016 | Weill | G06F 17/13 702/150 |

OTHER PUBLICATIONS

Falsi, Chiara, et al., "Time of Arrival Estimation for UWB Localizers in Realistic Environments," EURASIP Journal on Applied Signal Processing, vol. 2006, Article ID 32082, Hindawi Publishing Corporation, Jul. 10, 2006, 13 pages.

Krasny, Leonid, et al., "Performance of Successive Cancellation Techniques for Time of Arrival Estimation," Proceedings of the 56th Vehicular Technology Conference, vol. 4, IEEE, Vancouver, Canada, 2002, pp. 2278-2282.

Lee, Joon-Yong, et al., "Ranging in a Dense Multipath Environment Using an UWB Radio Link," IEEE Journal on Selected Areas in Communications, vol. 20, No. 9, IEEE, Dec. 2002, pp. 1677-1683.

International Search Report and Written Opinion for International Patent Application No. PCT/SE2016/050263, dated Nov. 24, 2016, 15 pages.

* cited by examiner

METHOD AND RECEIVING NODE FOR DETERMINING TIME OF ARRIVAL, TOA, FOR A RECEIVED RADIO SIGNAL

This application is a 35 U.S.C. § 371 national phase filing of International Application No. PCT/SE2016/050263, filed Mar. 30, 2016, the disclosure of which is incorporated herein by reference in its entirety.

TECHNICAL FIELD

The present disclosure relates generally to a method and a receiving node for determining Time Of Arrival, TOA, for a radio signal received from a transmitting node in a wireless network.

BACKGROUND

In this disclosure, the term "wireless device" is used to represent any communication entity capable of radio communication with a wireless network by sending and receiving radio signals, such as e.g. mobile telephones, tablets, laptop computers and Machine-to-Machine, M2M, devices, also known as Machine Type Communication, MTC, devices. Another common generic term in this field is "User Equipment, UE" which is frequently used herein as a synonym for wireless device.

Further, the term "network node", is used herein to represent any node of a wireless network that is operative to communicate radio signals with wireless devices, or to control some network entity having radio equipment for receiving/transmitting the radio signals. The network node in this disclosure could also be referred to as a base station, radio node, e-NodeB, eNB, NB, base transceiver station, access point, etc., depending on the type of wireless network and terminology used. The term eNB is frequently used herein as a synonym for network node.

Figure 1A:
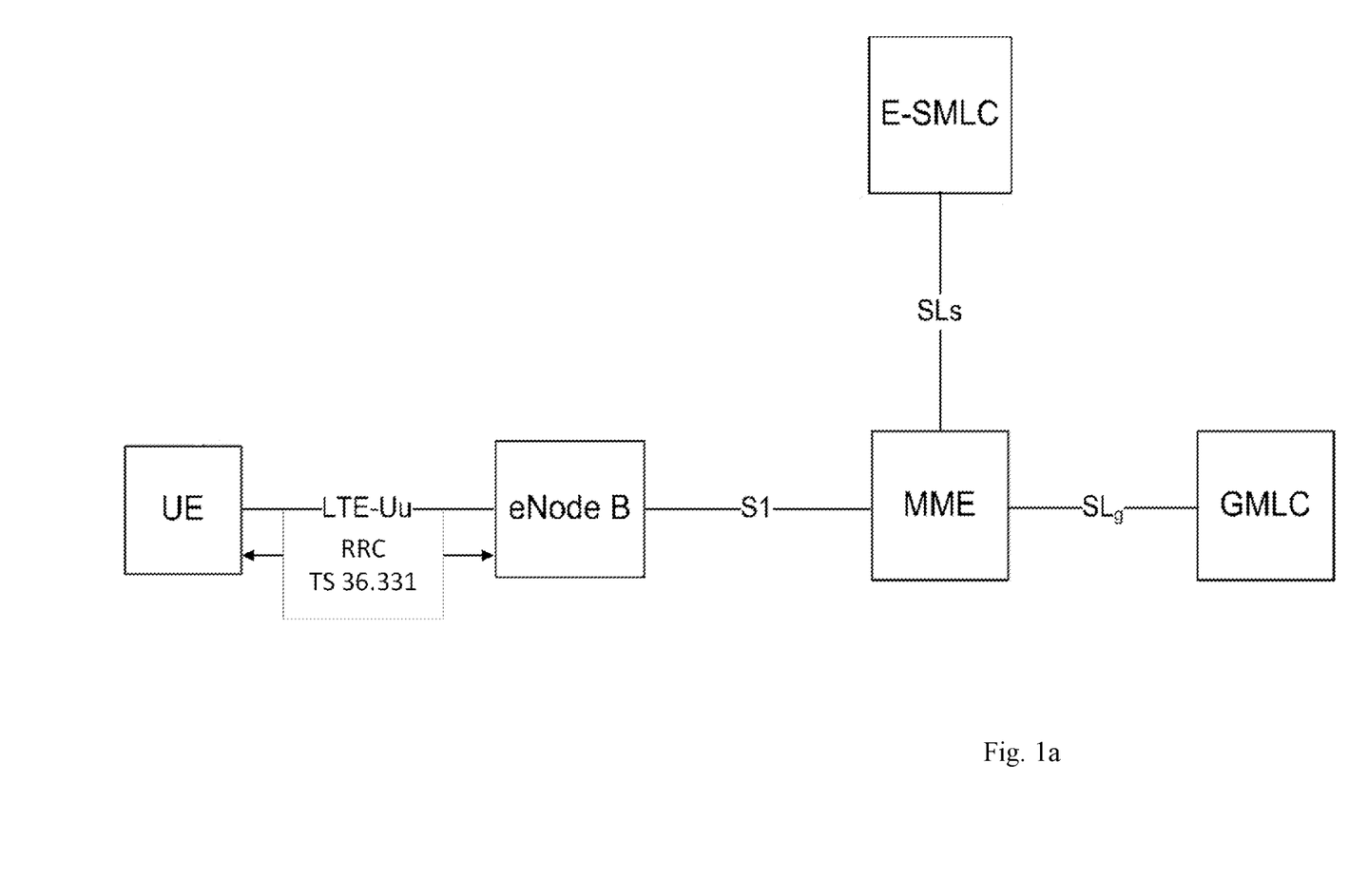
FIG. 1a illustrates a network architecture for positioning of a wireless device in an LTE network, where embodiments described herein may be used.

Location-based services and emergency call positioning are areas where positioning of wireless devices in wireless networks is needed, and a plethora of applications and services in the wireless devices take advantage of the position. Positioning in wireless networks employing Long Term Evolution, LTE, is supported by an architecture illustrated in FIG. 1a, employing direct interactions between a wireless device, here denoted UE, and a location server called Evolved-Serving Mobile Location Centre, E-SMLC, via the LTE Positioning Protocol, LPP. Moreover, there are also interactions between the location server and a network node denoted eNodeB, via the LPPa protocol, to some extent supported by interactions between the eNodeB and the UE via the Radio Resource Control, RRC, protocol.

The following positioning techniques are considered for use in LTE (3GPP 36.305):
Enhanced Cell ID. Essentially cell ID information to associate the UE to the serving area of a serving cell, and then additional information to determine the UE's position with greater accuracy.
Assisted GNSS. GNSS information retrieved by the UE, supported by assistance information provided to the UE from E-SMLC.
OTDOA (Observed Time Difference of Arrival). The UE estimates the time difference of reference signals from different base stations and sends the estimated time difference to the E-SMLC for multilateration.
UTDOA (Uplink TDOA). The UE is requested to transmit a specific waveform that is detected by multiple location measurement units such as base stations or eNBs located at known positions. These measurements are forwarded to the E-SMLC for multilateration.

In the above positioning methods, it is necessary to estimate the time-of-arrival, TOA, of a radio signal received at a receiving node which signal has been transmitted from a transmitting node. The TOA information can be used to determine the distance between the transmitting node and the receiving node, assuming that the signal travels in air with the speed of light.

Figure 1B:
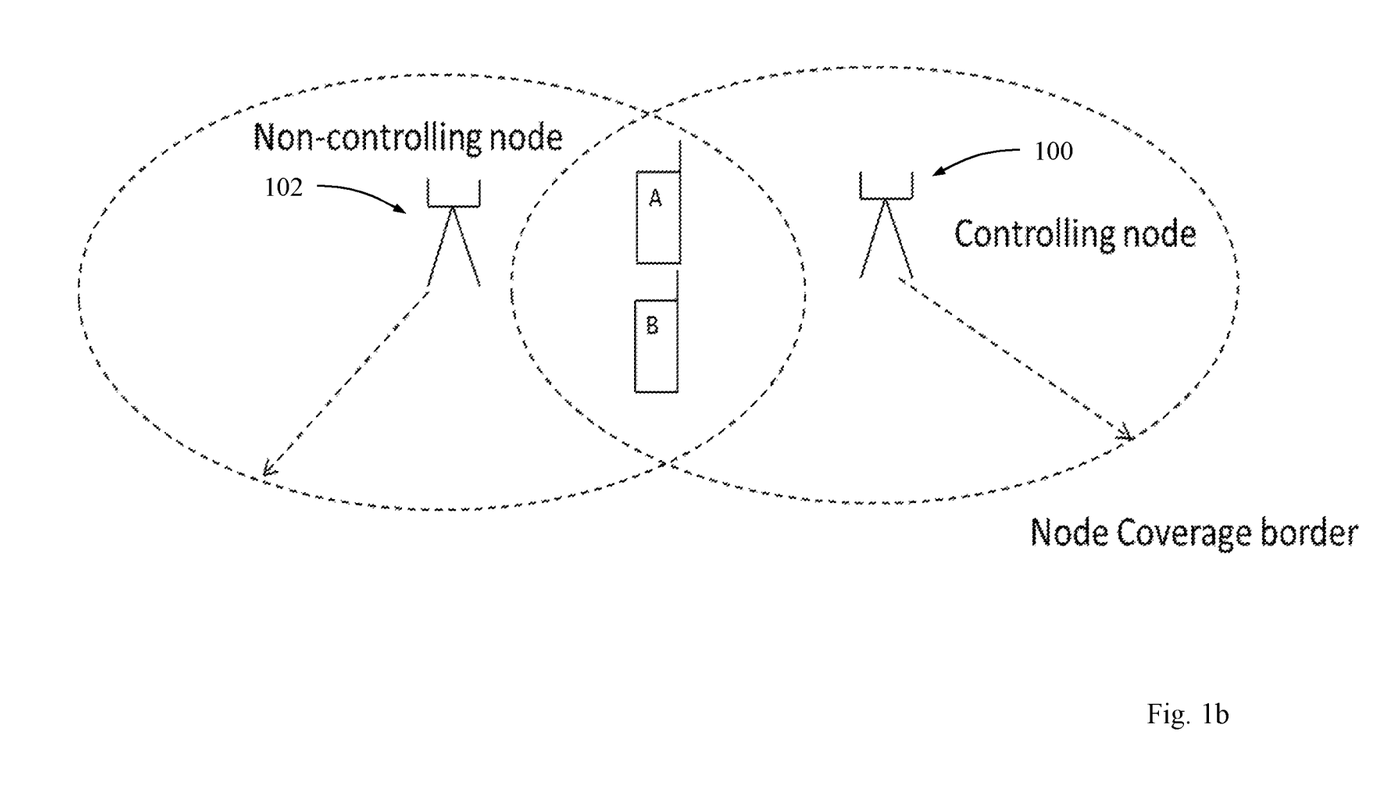
FIG. 1b illustrates a communication scenario where embodiments described herein may be used for supporting the positioning of a wireless device.

In a general scenario illustrated by FIG. 1b, a UE A is served/controlled by a serving/controlling node 100. In addition the UE A can possibly detect signals from one or more non-serving/non-controlling nodes 102. The UE A estimates the TOA of a signal from one transmitting node 100 or 102, possibly subject to an interfering signal from another node within coverage or communication range. Alternatively, significant interfering signals from other nodes may be avoided by employing a muting scheme where nodes alternating transmission and muting according to a schedule.

The above-described scenario may also be reversed, where TOA is estimated in a network node 100 or 102, based on a signal from a UE A, possibly subject to interference from a signal from a different UE B. Moreover, another scenario may also be that a UE A estimates a TOA based on a signal transmitted from a different UE, or a network node estimating TOA based on a signal transmitted from a different network node.

Figure 2:
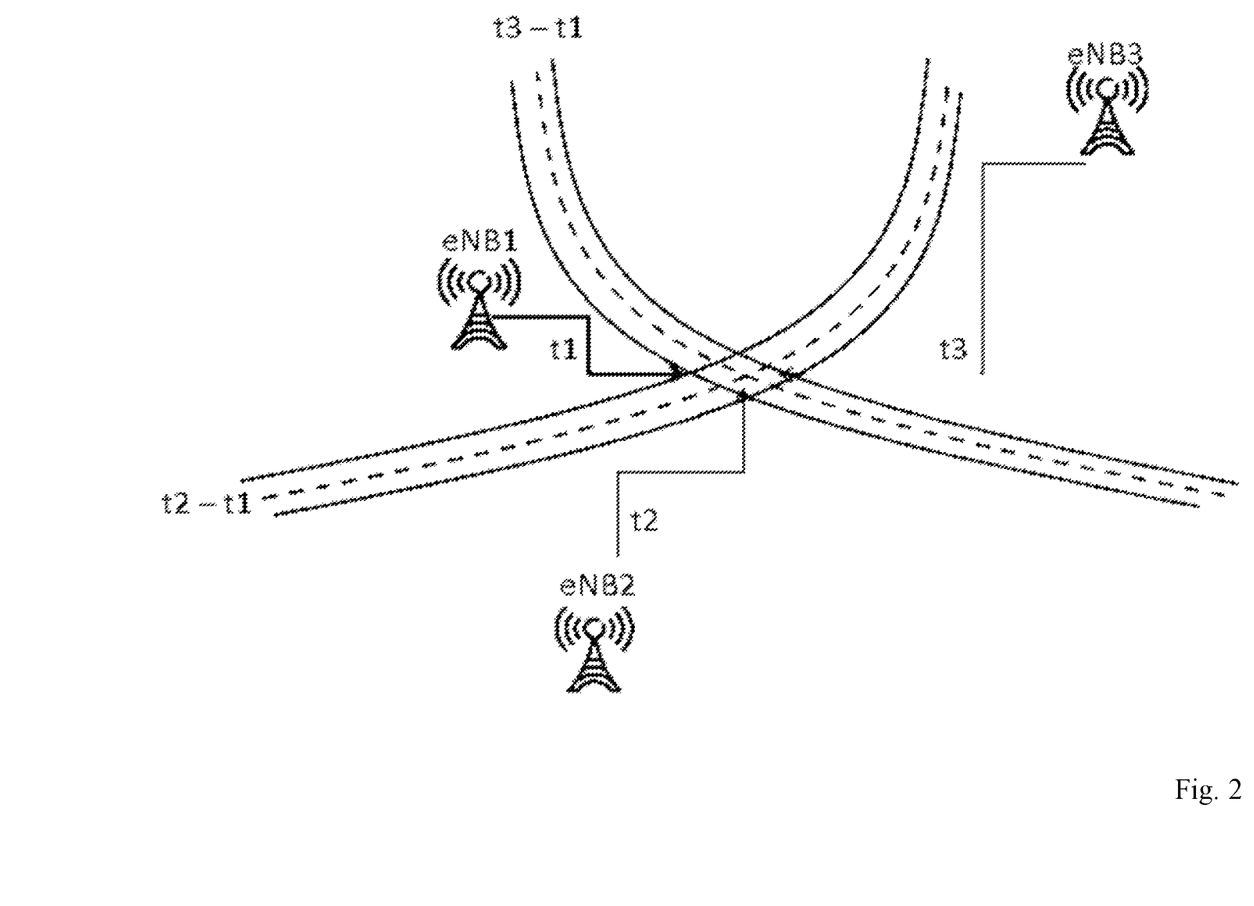
FIG. 2 illustrates another communication scenario where embodiments described herein may be used for supporting the positioning of a wireless device using multilateration.

For example, the Observed Time Difference Of Arrival, OTDOA, is a UE-assisted method, in which the UE measures the TOA of specific Positioning Reference Signals, PRS, from multiple cells or eNBs, and computes the relative differences of TOAs between each cell and a reference cell. These Reference Signal Time Differences, RSTDs, are quantized and reported via LPP to the E-SMLC together with an accuracy assessment. Based on known positions of eNBs and their mutual time synchronization, it is possible for the E-SMLC to estimate the UE position from the RSTD and covariance reports using multilateration. The accuracy of this estimation depends on the radio conditions of the received signals, the number of received signals as well as the deployment, which means that it will vary spatially. FIG. 2 illustrates an example of multilateration in OTDOA based on signals transmitted from different network nodes eNB1-eNB3 while considering eNB1 as the reference cell.

One of the factors which significantly impacts on the performance of OTDOA, is the accuracy in the UE of estimating the TOA.

SUMMARY

It is an object of embodiments described herein to address at least some of the problems and issues outlined above. It is possible to achieve this object and others by using a method and a receiving node as defined in the attached independent claims.

According to one aspect, a method is performed in a receiving node for determining Time Of Arrival, TOA, for a radio signal received from a transmitting node in a wireless network. In this method, the receiving node detects the received radio signal by cross-correlating the received radio signal with a predefined reference signal transmitted by the transmitting node, to obtain a Cross-Correlated Function, CCF. The receiving node further estimates a set of candidate TOAs for respective signal components of the cross-correlated signal, and determines a final TOA for the received radio signal based on the set of candidate TOAs.

Thereby, the TOA can be determined with greater accuracy and reliability, as compared to conventional procedures. In particular, it is more likely that the final TOA corresponds to the Line-of-Sight, LOS, component of the received radio signal, which is useful for determining the true distance between the transmitting and receiving nodes in a positioning procedure.

According to another aspect, a receiving node is arranged to determine Time Of Arrival, TOA, for a radio signal received from a transmitting node in a wireless network. The receiving node is configured to detect the received radio signal by cross-correlating the received radio signal with a predefined reference signal transmitted by the transmitting node, to obtain a Cross-Correlated Function, CCF. The receiving node is further configured to estimate a set of candidate TOAs for respective signal components of the cross-correlated signal, and to determine a final TOA for the received radio signal based on the set of candidate TOAs.

The above method and receiving node may be configured and implemented according to different optional embodiments to accomplish further features and benefits, to be described below.

A computer program is also provided comprising computer readable instructions which, when executed on the receiving node, cause the receiving node to carry out the method described above.

A computer program storage product is also provided comprising computer readable instructions which, when executed on the receiving node, cause the receiving node to carry out the method described above.

BRIEF DESCRIPTION OF DRAWINGS

The solution will now be described in more detail by means of exemplary embodiments and with reference to the accompanying drawings, in which.

DETAILED DESCRIPTION

Wireless channels are usually modelled as multipath channels, meaning that the receiving node receives several distorted and delayed copies of a transmitted radio signal through multiple reflections, diffraction, etc. These copies of the transmitted radio signal may be referred to as signal components which term will be used in this disclosure. "Tap" is another term that is synonymous with the term signal component in this context. The received signal components have thus travelled along different paths between transmitter and receiver depending on reflections etc. The above-described multi-path effect can be modelled by considering the following tapped delay link channel.

$$h(t) = \sum_{i=0}^{L} a_i \delta(t - \tau_1)$$

where L is the number of multipath taps (i.e., number of signal components received at the UE), $a_i$ denotes the complex attenuation of the l-th tap (i.e., attenuation of the l-th signal component received), $\tau_1$ indicates the time delay of the l-th tap and $\delta(t)$ is the delta function, which is one when t=0 and zero otherwise. In order to determine geographical distance between the transmitter and receiver antennas, it is necessary to measure $\tau_2$ (time delay corresponding to line-of-sight (LOS) tap) and scale it with the speed of light.

The TOA of the radio signal can be measured based on a reference signal that is known to the receiver. Assuming that the transmitted signal is denoted as "x(t)", then the received signal "y(t)" subject to multipath channel is given by $$y(t) = \sum_{i=0}^{L} a_i x(t - \tau_1) + w(t)$$

where a function denoted w(t) models additive noise and interference. Based on the received signal y(t) and the prior knowledge of the transmitted reference signal x(t), the receiver may compute time delay of the first channel tap $r_0$ (i.e., TOA of the LOS signal or the signal that arrives earliest if there is no LOS, since that translates to the distance between transmitter and receiver). However, since the received signal is embedded in noise and interference, it is not always easy to determine the first channel tap if it is not strong enough, which is usually the case in the indoor scenarios.

There are different methods that can be used to determine TOA at the receiving node. A simple and widely used method is to cross-correlate the received signal with the known transmitted reference signal, $$R[\tau] = \sum_{i=0}^{K} y[i] x^*[i - \tau].$$

where K is the length of the received signal discrete domain representation). The cross-correlation function r(τ)

gives channel impulse response. The squared absolute value of R(τ) corresponds to the Power Delay Profile, PDP, of the channel. The next step is to determine the first channel tap, which can be estimated by determining the first peak in R[τ] that is above a certain threshold.

$$\hat{\tau} = \operatorname{argmin}\left(\frac{|R[\tau]|}{\max\{|R|\}} \geq \zeta\right).$$

Finding the LOS signal component based on the cross-correlation is not an easy task for a UE. The UE needs to find a proper threshold in order to find the LOS component since the LOS tap is typically not the strongest tap. If the threshold is too low, the receiver can falsely detect noise as first channel tap and if the threshold is too high, the receiver may miss a weak LOS signal. Therefore, there is typically a trade-off between LOS detection and robustness to noise. For example, FIG. 3 and FIG. 4 show situations where a threshold, indicated as a horizontal line in the figures, is used for detecting the LOS component as the first peak that exceeds the threshold.

Figure 3:
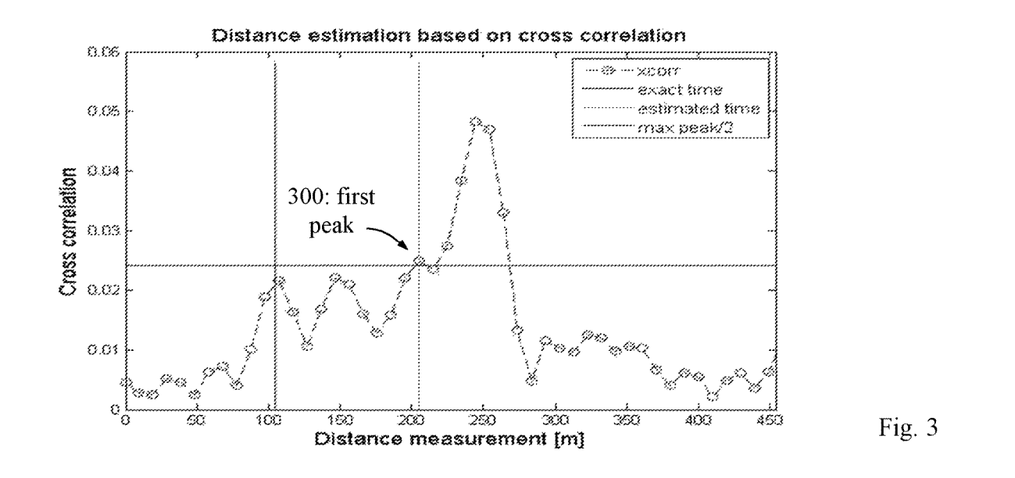
FIG. 3 is a diagram illustrating an example of how an error may occur when determining the distance between a transmitting node and a receiving node using cross correlation in a conventional manner.

In FIG. 3, the true LOS component, indicated by a vertical line at roughly 100 m, is not detected since the threshold is set too high. The first peak 300 exceeding the threshold is detected at roughly 200 m which may be caused by a reflected signal component which is stronger than the LOS component when received by the receiving node. In FIG. 4, the true LOS component, indicated by a vertical line at roughly 600 m, is not detected since the threshold is set too low here. The first peak 400 exceeding the threshold is detected at roughly 50 m which may be caused by fluctuating noise which is above the threshold when received by the receiving node. It is thus difficult, or even impossible, to set the threshold correctly to ensure that the true LOS component can be detected in this manner.

There are some existing methods, where the above-described threshold is adapted based on the Signal to Interference and Noise Ratio, SINR, level estimate at the receiver. The accuracy of estimating the TOA then depends on how accurate the SINR is measured and the threshold is accordingly adjusted, which is not always a reliable method. The implementation of such a method may require a table with signal quality to threshold mapping. It is not easy to create accurate tables that are always reliable and applicable, subject to the time varying nature of the channel and the interference.

Figure 4:
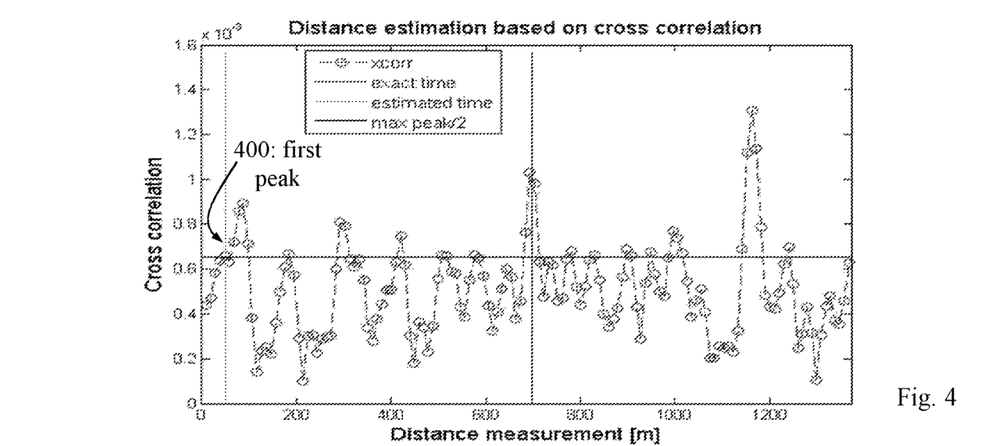
FIG. 4 is a diagram illustrating another example of how an error may occur when determining the distance between a transmitting node and a receiving node using cross correlation in a conventional manner.

In embodiments described herein, the TOA is determined based on CCF (cross-correlation function) that does not solely rely on applying a threshold (fixed or adaptive) for detecting peaks in the manner described for FIGS. 3 and 4. Some embodiments herein iteratively identify and collect peaks from the cross correlation and these significant peaks are removed or suppressed until only noise is basically left in the CCF. The TOA of the received signal is then determined based on the identified peaks.

In some of the examples described herein the receiving node is a wireless device, or UE, although these examples are also applicable if the receiving node is a network node. Using UE as an example of receiving node, the embodiments described herein may involve the following stages:

1) A UE receiving a request to estimate the reception time of a received signal, i.e. the TOA of the signal.
2) The UE determines a cross-correlation function between an expected signal and a received signal, and identifies a significant cross-correlation component, or peak, in the cross-correlation function. The UE associates the identified significant component with an estimate of the time of arrival, here also referred to as a candidate TOA, stores the TOA estimate and removes or suppresses the significant component from the cross-correlation function.
3) The UE then determines whether the modified cross-correlation function is classified as noise or not. If not noise, then go to stage 2 and identify the next significant cross-correlation component in the cross-correlation function, else go to stage 4.
4) Determine TOA based on the stored TOA estimates, also referred to as a set of candidate TOAs.

Advantages that may be achieved when using embodiments described herein may include:

The TOA estimation accuracy is increased due to multi-peak-detection with robustness to noise.

No signal quality to threshold mapping is needed since the above-described procedure iteratively choses the strongest peak in the cross-correlation function with a noise based stopping criteria.

The solution described herein may be applied at a wireless device or UE for downlink positioning techniques (i.e. OTDOA), or at a network node or eNB for uplink positioning techniques (i.e. UTDOA).

Figure 5:
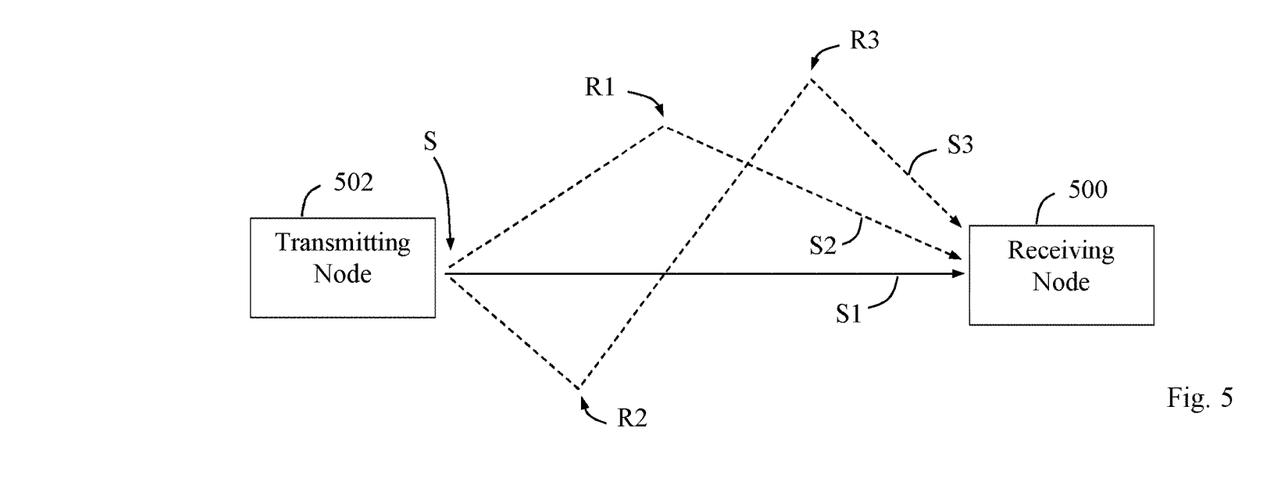
FIG. 5 is a communication scenario illustrating how a signal may take different routes between a transmitting node and a receiving node, where embodiments described herein may be used for supporting the positioning of a wireless device being either of the transmitting and receiving nodes.

FIG. 5 illustrates that a receiving node 500 receives a radio signal which is transmitted by a transmitting node 502. The transmitting node 502 thus transmits an original signal S which is reflected against different objects such as buildings or other surfaces, such that the signal may arrive at the receiving node 500 divided into multiple components, referred to as signal components. Thus, the signal components may arrive at different times depending on different travelling distances including any reflections.

In this example, it is schematically illustrated that the radio signal S transmitted by the transmitting node 502 arrives at the receiving node 500 as multiple signal components S1-S3 which have travelled along different paths between node 502 and node 500. As a result, the signal components arrive at the receiving node 500 at different times, i.e. with different TOAs. The first received signal component S1 is the one that travels the shortest path without reflection, i.e. the LOS path. The next received signal component S2 travels a longer path including one refection R1, and the following received signal component S3 travels an even longer path including two reflections R2 and R3.

It is thus the TOA of component S1 that corresponds to the true distance between node 502 and node 500, i.e. the LOS path. Hence, the TOA of S1 is useful for determining the position of a wireless device, which in this context can be either of the transmitting node 502 and the receiving node 500, while the TOAs for S2 and S3 are more or less misleading and inaccurate for this purpose.

An example will now be described, with reference to the flow chart in FIG. 6, of how the solution may be employed in terms of actions performed in a receiving node, such as the above-described receiving node 500, for determining Time Of Arrival, TOA, for a radio signal received from a transmitting node in a wireless network. It should be noted that this solution is can be employed to support positioning of a wireless device regardless of whether the receiving node is the wireless device itself or a network node to which the wireless device is connected. The TOA can thus be translated into the actual distance between the wireless device and the network node which in the above example corresponds to the LOA path of component S1.

A first action 600 illustrates that receiving node detects the received radio signal by cross-correlating the received radio signal with a predefined reference signal transmitted by the transmitting node, to obtain a Cross-Correlated Function, CCF. An example of how such cross-correlation of a received signal with a known reference signal can basically be done as such was described above.

In a next action 602, the receiving node estimates a set of candidate TOAs for respective signal components of the cross-correlated signal. It will be described later below, with reference to a more detailed procedure illustrated by FIG. 7, how the estimation of candidate TOAs may be performed. Another action 604 illustrates that the receiving node determines a final TOA for the received radio signal based on the set of candidate TOAs, which may be done in different ways to be described below.

The final TOA is thus the TOA of the signal component that has propagated from the transmitting node to the receiving node without reflection, i.e. Line-of-Sight, LOS, component of the received radio signal, such as signal component S1 in the above example. The final TOA thus corresponds to the distance between the transmitting and receiving nodes and can therefore be used as a basis for determining the position of a wireless device being either of the transmitting and receiving nodes.

Some non-limiting example embodiments that can be used in the above procedure, will now be described. In one example embodiment, the signal components of the cross-correlated signal may be identified as peaks in the CCF. In another example embodiment, the receiving node may estimate the candidate TOAs by iteratively estimating a candidate TOA for the strongest signal component of the cross-correlated signal. After each candidate TOA estimation, the receiving node modifies the cross-correlated signal by removing, i.e. suppressing, said strongest signal component from the cross-correlated signal before estimating the next candidate TOA.

In another example embodiment, the strongest signal component may be removed/suppressed from the cross-correlated signal by using autocorrelation of the radio signal transmitted by the transmitting node. In another example embodiment, the iteratively estimating of a candidate TOA may be repeated until a predefined stopping criterion related to the amount of noise in the modified cross-correlated signal is met. The stopping criterion may basically dictate that the iteration is stopped when the modified cross-correlated signal can be chiefly regarded as noise which may be detected in different ways as follows.

Thus according to further example embodiments, the stopping criterion may comprise at least one of:
a Peak-to-Average Ratio, PAR, of the modified cross-correlated signal is below a predefined PAR threshold,
an average of the CCF is below a predefined average threshold,
a summed absolute value of the CCF is below a predefined summed absolute value threshold,
a maximum peak amplitude value in the modified cross-correlated signal is below a peak amplitude threshold, and
the number of performed iterations has reached a maximum iteration threshold.

Most of the above conditions basically indicate that the modified cross-correlated signal can be chiefly regarded as noise, while the last condition above may be needed to limit the processing time and complexity in the receiving node. In another example embodiment, one or more of the above thresholds may be dependent on at least one of: capability of the receiving node and properties of the received radio signal. In another example embodiment, one or more of said thresholds may be obtained when signalled from the wireless network. For example, if the receiving node is a wireless device it may receive the one or more thresholds from the network node to which it is currently connected, or from another network node, e.g. when signalled from a location server. In another example, if the receiving node is a network node it may obtain the one or more thresholds from a memory in the network node or from another node of the wireless network such as the location server.

It was mentioned above that in action 604 the receiving node may determine the final TOA for the received radio signal based on the set of candidate TOAs in different ways. In one example embodiment, the final TOA may be determined by choosing a minimum or mean value of the candidate TOAs. In another example embodiment, the final TOA may be determined by performing an arithmetic operation on the candidate TOAs.

In another example embodiment, at least one candidate TOA may be excluded from the set of candidate TOAs based on a predefined excluding criterion, before the final TOA is determined. In that case, further example embodiments include that the predefined excluding criterion may be related to at least one of: sensor information, historic measurements, previously determined final TOAs, network/measurement geometry, interfering measurement, properties of the predefined reference signal, finger printing information, and indoor/outdoor scenario detection.

As mentioned above, the receiving node may be a wireless device and the transmitting node may be a network node of the wireless network, according to another example embodiment.

Alternatively, the receiving node may be a network node of the wireless network and the transmitting node may be a wireless device, according to another example embodiment.

A more detailed example of how the procedure of FIG. 6 may be implemented according to some embodiments, will now be described with reference to a flow chart shown in FIG. 7. In this example the receiving node is a wireless device or UE, although the receiving node may alternatively be a network node.

Step 700: The UE is configured for detection of a radio signal transmitted by a transmitting node which may be a serving network node, a non-serving network node or another wireless device.

Step 702: The UE receives and detects the radio signal by cross-correlating the received signal with a known reference signal to obtain a Cross-Correlated Function, CCF, which may be performed in the manner described above. The CCF can be seen as an estimate of the channel impulse response (or power delay profile), and the CCF is given by:

$$\hat{R}[\tau] = \sum_{i=0}^{K} y[i]x^*[i-\tau]. \tag{1}$$

where K is the length of the received signal vector "y" and (*) denotes the complex conjugate.

Step 704: The UE identifies a significant, i.e. the strongest, signal component in the CCF and estimates a candidate TOA for the identified signal component. The identified signal component thus corresponds to a peak in the CCF. A TOA estimate based on the CCF ($\hat{R}[\tau]$), can be determined by identifying time delay of the most significant component (peak in the correlation function), given by $\tau_i = \arg\max(|\hat{R}[\tau]|)$.

Step 706: The UE associates and stores the estimated candidate TOA for the identified signal component and modifies the processed signal by removing or suppressing the identified signal component from the CCF. By repeating step 706 for multiple different signal components, a set of candidate TOAs is defined. Here, the term "TOA estimate" corresponds to the above-described candidate TOA. The time or TOA estimated in step 120 above ($\tau_i$) is thus stored in the set of candidate time estimates or TOAs.

In order to suppress the information of the detected peak in the CCF, it is possible to use the autocorrelation of the transmitted signal x. The autocorrelation includes information of how the detected peak contributes to the CCF. Mathematically, the autocorrelation function (ACF) can be computed using:

$$r[k] = \sum_i x[i] x^i[i-k],$$

where i is constrained by the length of the transmitted signal. Also, the ACF is normalized in order to have peak value 1 at lag 0. That is, $$\hat{r}[k] = \frac{r[k]}{r[0]}$$

Then, the new cross-correlation function is calculated by removing the strongest peak existing in the CCF, i.e., the CCF is updated as follows:

$$\widetilde{R_{new}}[\tau] = \hat{R}[\tau] - \hat{R}[\tau_i]\hat{r}[\tau - \tau_i]$$

Step 708: The UE determines whether the modified signal can be classified as noise or not. Based on $\widetilde{R_{new}}[\tau]$ and a stopping criterion, it is basically determined in this step whether the CCF needs to be further estimated and a further candidate TOA needs to collected or not. Basically, the stopping criterion along with the updated CCF determines if one should not go to Step 150 or return to Step 120. Different stopping criteria are discussed in Section 5.1.

Step 710: Based on the stored set of candidate TOAs (in Step 706), a final TOA can be determined. Different ways of determining the final TOA have been described above.

The stopping criteria used in the above step 708 may be dependent on various factors and parameters, such as estimated CCF, properties of the transmitted reference signal, estimated interference in the wireless network, geometry of the wireless network, historic measurements, UE measurements, any assistance information from the transmitter node. In the following, some examples of the stopping criteria are further described.

The stopping criteria may be dependent on a noise estimate of the CCF. The concept here is that the iterative procedure of collecting valid peaks should stop when the updated CCF ($\widetilde{R_{new}}[\tau]$) is too noisy to extract a reliable information related to TOA i.e., the iterations of repeating steps 704 and 706 should stop when reliable information about the multi-path channel cannot be retrieved. There can be different stopping criteria. In the following, a few possible stopping criteria are outlined, which have also been mentioned above.

One of the above-mentioned stopping criteria is to use the Peak-to-Average Ratio (PAR) of the CCF. A CCF with high noise power will have lower PAR in comparison to a CCF with low noise power. PAR can be calculated as:

$$PAR(\hat{R}) = \frac{\max(|\hat{R}|)}{\mathrm{mean}(|\hat{R}|)}.$$

Then, a stopping criteria would be to stop collecting time estimates if $PAR(\hat{R}) < PAR_{threshold}$. The $PAR_{threshold}$ can be based on one or a combination of several different factors. These factors may comprise any of:
UE capability.
Properties of the transmitted signal x.
Properties of interfering signals.
History-based feedback from UE, or feedback from other UEs with similar properties.
Stored fingerprinting information.

In step 710, the final TOA may be determined based on the set of candidate TOAs in different ways. In the following, some examples are further described:
The final TOA may be directly computed from the candidate set by choosing a minimum value or mean value or by performing any other arithmetic operation.
The final TOA may be computed from the candidate set by performing an arithmetic operation or some type of comparison that involves other parameters such as finger printing information, network geometry, any assistance information from the transmitter node or the wireless network.
The set of candidate time estimates can be first reduced to form a subset of candidate time estimates, where the subset of time estimates is obtained by deleting (or excluding) some candidates from the set of candidate estimates. The criteria for excluding some candidates, that is the above-mentioned predefined excluding criterion, may be dependent on some additional sources of information such as sensor information, historic measurements, previously estimated position (TOAs), network/measurement geometry, interfering measurement, properties of reference signals, finger printing information, and indoor/outdoor scenario detection.

While coherent combining may be employed in the embodiments herein, it is still possible to consider the same procedure for non-coherent combining scenarios in which for example the radio signal is received at multiple antennas, or if the reference signal is separated in time with larger than the coherence-time interval. If non-coherent combining is employed, the iterative peak-detection algorithm of steps 704 and 706 would be applied to each input signal separately, and the result would be combined using for example any arithmetic operation of each signals time estimate.

While the procedure has been explained for the downlink procedure technique (e.g. OTDOA) and has been considered at the UE, it is also applicable to the uplink procedure techniques (e.g. UTDOA). In this case, it would be applied at the network node (e.g. eNB). In this embodiment, the steps in FIG. 7 could be considered in a more advanced level due to more capabilities at the network node compared to the UE. Moreover, the certainty of TOA estimation in the uplink would become more precise as the network has more information about the receiver model and the parameters of iterative peak detection algorithm, while in UE it is more dependent on UE capabilities.

An example of the above-described procedure will now be described with reference to FIG. 8 which illustrates the absolute value of the CCF ($|\hat{R}|$) after iterations 1-6, respectively, have been performed, basically by executing steps 704-708 in the procedure of FIG. 7. In this figure, at each iteration, the peak of the CCF is found and its contribution in the CCF will be eliminated to the next iteration. Hence, the CCF PAR value is always a lower value in the next iteration compared to the current one. The procedure continues until some stopping criterion has been fulfilled (e.g. PAR($\hat{R}$)<PAR$_{threshold}$). In this particular example, the time estimation would be applied after the sixth iteration, since in this example the PAR($\hat{R}$) is below the threshold after removing the peak found in iteration 6. The 6 time estimates, or candidate TOAs, can be found in the figure to be $\tau_0=45$, $\tau_1=40$, $\tau_2=37$, $\tau_3=35$, $\tau_4=33$, $\tau_5=26$. Then, the final time estimate, or final TOA, is determined as the minimum of the 6 time estimates or candidate TOAs, the final time estimate or TOA is thus equal to 26. The true time estimation has been identified with a dashed line in all figures, the final time estimate is close to the LOS peak (an accurate estimate). Note that there is always quantization error present in LOS peak estimation.

In the solution described herein, it is possible to achieve higher TOA accuracy with noise robust peak detection. Based on the cross-correlation, some of the embodiments herein may iteratively find peaks and the final TOA is determined based on the noise-valid peaks.

Figure 9:
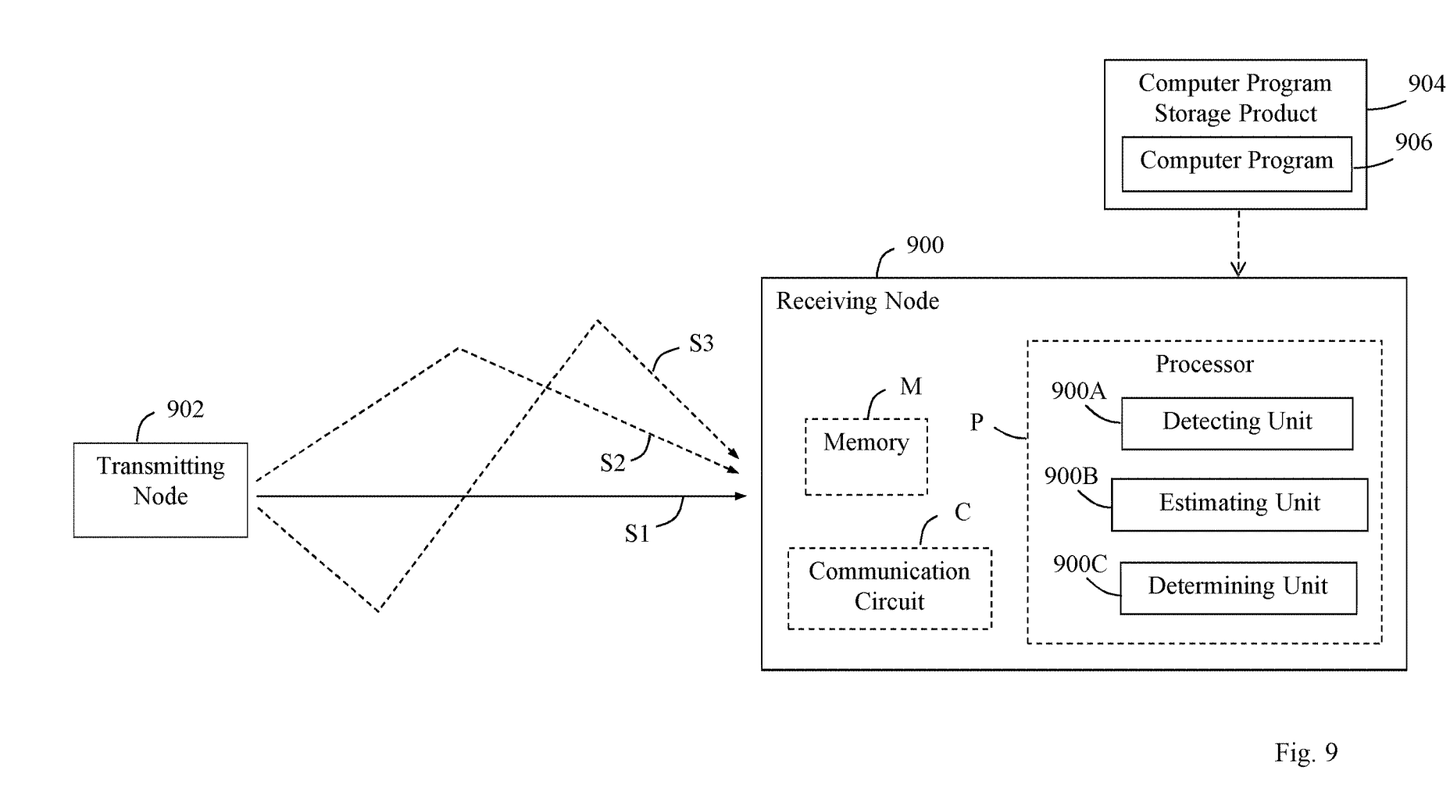
FIG. 9 is a block diagram illustrating a receiving node in more detail, according to further possible embodiments.

The block diagram in FIG. 9 illustrates a detailed but non-limiting example of how a receiving node 900 may be structured to bring about the above-described solution and embodiments thereof. The receiving node 900 corresponds to the receiving node 500 shown in FIG. 5 and it may be configured to operate according to any of the examples and embodiments of employing the solution as described above, where appropriate, and as follows. The receiving node 900 is shown to comprise a processor P and a memory M, said memory comprising instructions executable by said processor P whereby the receiving node 900 is operative as described herein. The receiving node 900 also comprises a communication circuit C with suitable equipment for receiving radio signals in the manner described herein.

The communication circuit C is configured for communication with a transmitting node, not shown, using suitable protocols depending on the implementation, which is not necessary to describe here as such in any detail. The solution and embodiments herein are thus not limited to using any specific types of wireless networks, technology or protocols for radio communication.

Figure 6:
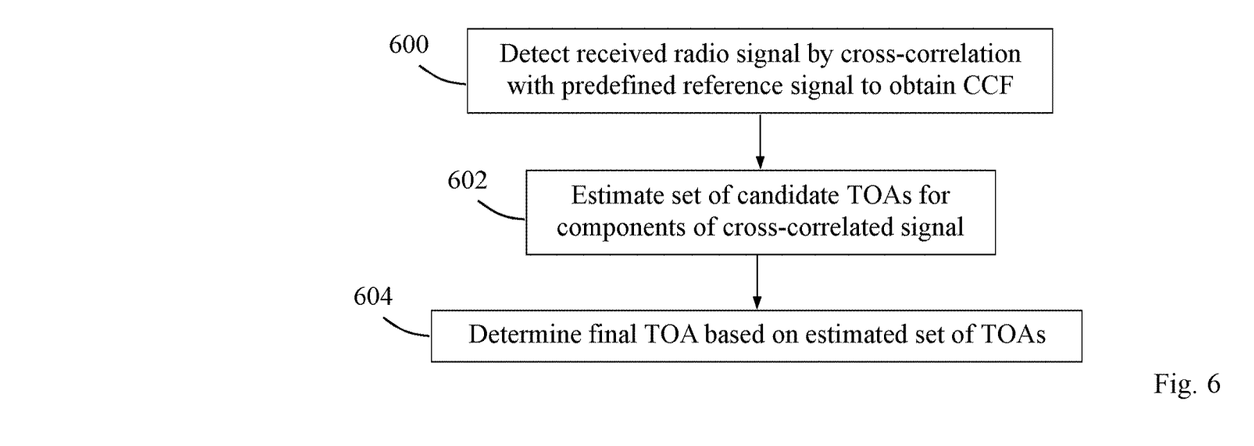
FIG. 6 is a flow chart illustrating a procedure in a receiving node, according to further possible embodiments.
Figure 7:
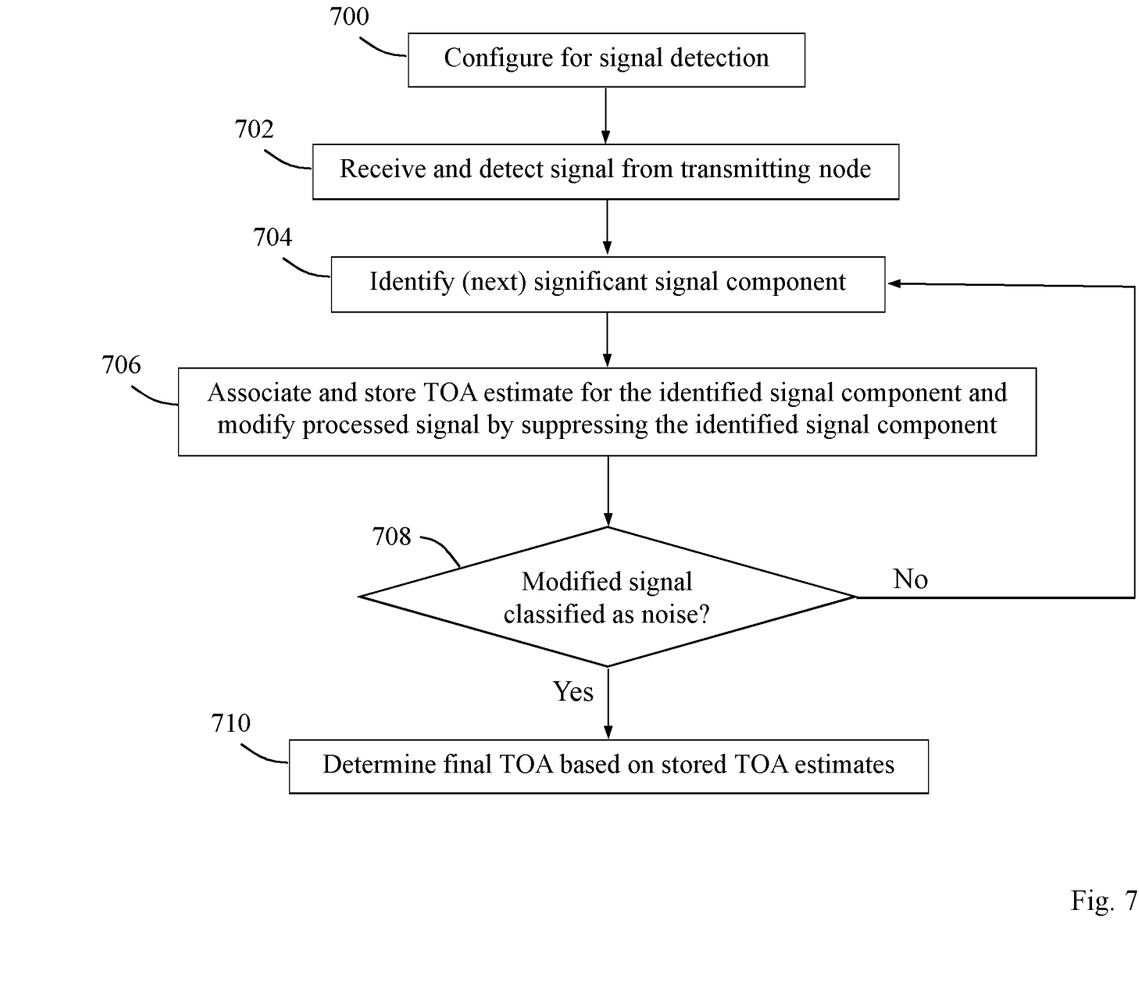
FIG. 7 is another flow chart illustrating a more detailed procedure in a receiving node, according to further possible embodiments.
Figure 8:
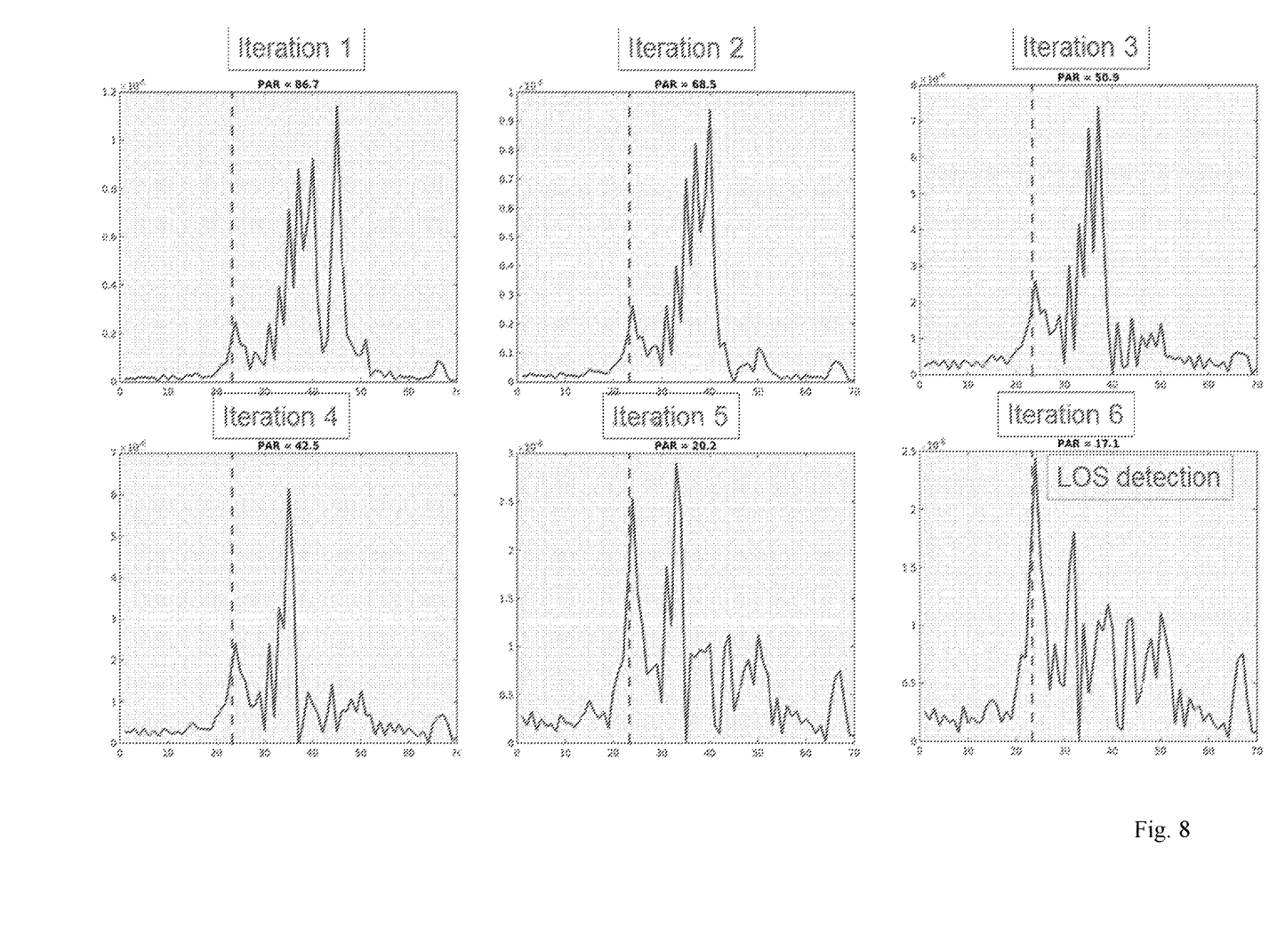
FIG. 8 illustrates some diagrams of a cross-correlation function after different iterations 1-6 have been performed e.g. in the procedure of FIG. 7.

The receiving node 900 comprises means configured or arranged to perform the actions 600-604 of the flow chart in FIG. 6 and at least some of the actions 700-710 of the flow chart in FIG. 7. The receiving node 900 is arranged to determine Time Of Arrival, TOA, for a radio signal received from a transmitting node 902 in a wireless network.

The receiving node 900 is configured to detect the received radio signal by cross-correlating the received radio signal with a predefined reference signal transmitted by the transmitting node 904, to obtain a Cross-Correlated Function, CCF. This detecting operation may be performed by a detecting unit 900A in the receiving node 900, e.g. in the manner described for action 600 above. The receiving node 900 is further configured to estimate a set of candidate TOAs for respective signal components of the cross-correlated signal. This estimating operation may be performed by an estimating unit 900B in the receiving node 900, e.g. as described for action 602 above.

The receiving node 900 is also configured to determine a final TOA for the received radio signal based on the set of candidate TOAs. This determining operation may be performed by a determining unit 900C in the receiving node 900, e.g. as described for action 604 above.

It should be noted that FIG. 9 illustrates various functional units in the receiving node 900, and the skilled person is able to implement these functional units in practice using suitable software and hardware. Thus, the solution is generally not limited to the shown structures of the receiving node 900, and the functional units 900A-C therein may be configured to operate according to any of the features and embodiments described in this disclosure, where appropriate.

The functional units 900A-C described above can be implemented in the receiving node 900 by means of suitable hardware and program modules of a computer program comprising code means which, when run by the processor P causes the receiving node 900 to perform at least some of the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the receiving node 900 in the form of a memory having a computer readable medium and being connected to the processor P. The computer program product or memory in the receiving node 900 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or hard drive storage (HDD), and the program modules could in alternative embodiments be distributed on different computer program products in the form of memories within the receiving node 900.

The solution described herein may be implemented in the receiving node 900 by means of a computer program storage product 904 comprising a computer program 906 with computer readable instructions which, when executed on the receiving node 900, cause the receiving node 900 to carry out the actions according to any of the above embodiments, where appropriate.

While the solution has been described with reference to specific exemplifying embodiments, the description is generally only intended to illustrate the inventive concept and should not be taken as limiting the scope of the solution. For example, the terms "receiving node", "network node", "wireless device", "signal component" and "stopping criteria" have been used throughout this disclosure, although any other corresponding entities, functions, and/or parameters could also be used having the features and characteristics described here. The solution is defined by the appended claims.

Abbreviations
3GPP Third Generation Partnership Project
CCF Cross-Correlation Function
D2D Device-to-device
eNB evolved Node B
E-SMLC Evolved-Serving Mobile Location Centre
IEEE Institute of Electrical and Electronics Engineers
LTE Long Term Evolution
LPP LTE Positioning Protocol
OTDOA Observed Time Difference of Arrival
PDP Power Delay Profile PRS Positioning Reference Signal
RSTD Reference Signal Time Difference
SINR Signal to Interference and Noise Ratio
TDOA Time Difference of Arrival
TOA Time of Arrival

The invention claimed is:

1. A method in a receiving node for determining Time Of Arrival, TOA, for a radio signal received from a transmitting node in a wireless network, the method comprising:
   detecting the received radio signal by cross-correlating the received radio signal with a predefined reference signal transmitted by the transmitting node to obtain a Cross-Correlated Function, CCF;
   estimating a set of candidate TOAs for respective signal components of the cross-correlated signal;
   excluding at least one candidate TOA from the set of candidate TOAs based on a predefined excluding criterion related to at least one of: sensor information, historic measurements, previously determined final TOAs, network/measurement geometry, interfering measurement, properties of the predefined reference signal, finger printing information, and indoor/outdoor scenario detection; and
   determining a final TOA for the received radio signal based on the set of candidate TOAs.

2. The method according to claim 1, wherein said signal components of the cross-correlated signal are identified as peaks in the CCF.

3. The method according to claim 1, wherein estimating the candidate TOAs comprises iteratively estimating a candidate TOA for the strongest signal component of the cross-correlated signal and modifying the cross-correlated signal by removing/suppressing said strongest signal component from the cross-correlated signal before estimating the next candidate TOA.

4. The method according to claim 3, wherein the strongest signal component is removed/suppressed from the cross-correlated signal by using autocorrelation of the radio signal transmitted by the transmitting node.

5. The method according to claim 3, wherein iteratively estimating a candidate TOA is repeated until a predefined stopping criterion related to the amount of noise in the modified cross-correlated signal is met.

6. The method according to claim 5, wherein the stopping criterion comprises at least one of:
   a Peak-to-Average Ratio, PAR, of the modified cross-correlated signal is below a predefined PAR threshold,
   an average of the CCF is below a predefined average threshold,
   a summed absolute value of the CCF is below a predefined summed absolute value threshold,
   a maximum peak amplitude value in the modified cross-correlated signal is below a peak amplitude threshold, and
   the number of performed iterations has reached a maximum iteration threshold.

7. The method according to according to claim 6, wherein one or more of said thresholds is/are dependent on at least one of: capability of the receiving node and properties of the received radio signal.

8. The method according to according to claim 6, wherein one or more of said thresholds is/are obtained when signaled from the wireless network.

9. The method according to claim 1, wherein the final TOA is determined by choosing a minimum or mean value of the candidate TOAs.

10. The method according to claim 1, wherein the final TOA is determined by performing an arithmetic operation on the candidate TOAs.

11. The method according to claim 1, wherein the receiving node is a wireless device and the transmitting node is a network node of the wireless network.

12. The method according to claim 1, wherein the receiving node is a network node of the wireless network and the transmitting node is a wireless device.

13. A receiving node arranged to determine Time Of Arrival, TOA, for a radio signal received from a transmitting node in a wireless network, wherein the receiving node is configured to:
   detect the received radio signal by cross-correlating the received radio signal with a predefined reference signal transmitted by the transmitting node, to obtain a Cross-Correlated Function, CCF;
   estimate a set of candidate TOAs for respective signal components of the cross-correlated signal;
   excluding at least one candidate TOA from the set of candidate TOAs based on a predefined excluding criterion related to at least one of: sensor information, historic measurements, previously determined final TOAs, network/measurement geometry, interfering measurement, properties of the predefined reference signal, finger printing information, and indoor/outdoor scenario detection; and
   determine a final TOA for the received radio signal based on the set of candidate TOAs.

14. The receiving node according to claim 13, wherein the network node is configured to identify said signal components of the cross-correlated signal as peaks in the CCF.

15. The receiving node according to claim 13, wherein the network node is configured to estimate the candidate TOAs by iteratively estimating a candidate TOA for the strongest signal component of the cross-correlated signal and modifying the cross-correlated signal by removing/suppressing said strongest signal component from the cross-correlated signal before estimating the next candidate TOA.

16. The receiving node according to claim 15, wherein the network node is configured to remove/suppress the strongest signal component from the cross-correlated signal by using autocorrelation of the radio signal transmitted by the transmitting node.

17. The receiving node according to claim 15, wherein the network node is configured to repeat the iteratively estimating a candidate TOA until a predefined stopping criterion related to the amount of noise in the modified cross-correlated signal is met.

18. The receiving node according to claim 17, wherein the stopping criterion comprises at least one of:
   a Peak-to-Average Ratio, PAR, of the modified cross-correlated signal is below a predefined PAR threshold,
   an average of the CCF is below a predefined average threshold,
   a summed absolute value of the CCF is below a predefined summed absolute value threshold,
   a maximum peak amplitude value in the modified cross-correlated signal is below a peak amplitude threshold, and
   the number of performed iterations has reached a maximum iteration threshold.

19. The receiving node according to according to claim 18, wherein one or more of said thresholds is/are dependent on at least one of: capability of the receiving node and properties of the received radio signal.

20. The receiving node according to according to claim 18, wherein the network node is configured to obtain one or more of said thresholds when signalled from the wireless network.

21. The receiving node according to claim 13, wherein the network node is configured to determine the final TOA by choosing a minimum or mean value of the candidate TOAs.

22. The receiving node according to claim 13, wherein the network node is configured to determine the final TOA by performing an arithmetic operation on the candidate TOAs.

23. The receiving node according to claim 13, wherein the receiving node is a wireless device and the transmitting node is a network node of the wireless network.

24. The receiving node according to claim 13, wherein the receiving node is a network node of the wireless network and the transmitting node is a wireless device.

25. For determining Time Of Arrival, TOA, for a radio signal received from a transmitting node in a wireless network, a non-transitory computer-readable storage medium comprising a computer program product including instructions to cause at least one processor to:
   detecting the received radio signal by cross-correlating the received radio signal with a predefined reference signal transmitted by the transmitting node, to obtain a Cross-Correlated Function, CCF;
   estimating a set of candidate TOAs for respective signal components of the cross-correlated signal;
   excluding at least one candidate TOA from the set of candidate TOAs based on a predefined excluding criterion related to at least one of: sensor information, historic measurements, previously determined final TOAs, network/measurement geometry, interfering measurement, properties of the predefined reference signal, finger printing information, and indoor/outdoor scenario detection; and
   determining a final TOA for the received radio signal based on the set of candidate TOAs.

* * * * *